United States Patent Office 3,096,139
Patented July 2, 1963

3,096,139
UNION DYEING ACRYLONITRILE COPOLYMER AND WOOL BLENDS
Walter H. Hindle, Decatur, Ala., assignor, by mesne assignments, to Monsanto Chemical Company, a corporation of Delaware
No Drawing. Filed Sept. 12, 1957, Ser. No. 683,455
11 Claims. (Cl. 8—21)

This invention relates to a process for union dyeing of blends of acrylic fibers with wool and more particularly, it relates to a method of union dyeing blends of fibers containing acrylonitrile and certain basic monomers in polymeric form with wool fibers by means of dyestuffs normally used for dyeing wool.

It is well known that polyacrylonitrile and copolymers of acrylonitrile and other mono-olefinic polymerizable monomers are excellent fiber-forming materials. The polyacrylonitrile and copolymers of more than 80 percent of acrylonitrile and up to 20 percent of other polymerizable monomers produce fibers with superior tensile properties, desirable elongation, and excellent stability under a wide range of physical and chemical conditions. The presence of the aforementioned desirable properties in acrylic fibers make them admirably suited for blending with other textile fibers, both natural and synthetic, and this is particularly true in respect to blends of the acrylic fibers with wool. However, acrylic fibers consisting of polyacrylonitrile and copolymers of more than 80 percent of acrylonitrile and up to 20 percent of other polymerizable monomers suffer from inherent disabilities which greatly restrict their utility in the fabrication of blends with other fibers such as wool. For example, such acrylic fibers lack affinity for most classes of common dyestuffs employed for wool. This disability to dye to deep and fast colors by conventional dyeing techniques has deterred the wide-scale use of acrylic fibers in blends with wool because of the inability to union dye such fiber blends to the same depth of shade by conventional dyeing procedures.

The dye-receptivity of acrylonitrile polymers has been greatly improved by utilizing as the comonomer certain basic compounds, particularly heterocyclic compounds containing a tertiary nitrogen in the ring and substituted with a polymerizable alkenyl group. Still further improvements in dye-receptivity and other properties of acrylonitrile fibers have been effected by blending polymers or copolymers of acrylonitrile containing at least 80 percent of acrylonitrile in polymeric form with a second copolymer containing at least 30 percent of a basic monomer which is preferably a heterocyclic compound containing a tertiary nitrogen atom in the ring and a polymerizable alkenyl group substituted thereon. These blends may have as the principal polymer from 70 to 98 percent of a copolymer of 80 or more percent acrylonitrile and minor proportions of monomers copolymerizable therewith. The other blend constituent is a polymer of 30 or more percent of the basic monomer and up to 70 percent of another copolymerizable monomer. The two components of the blended copolymers are proportioned so as to provide from 2 to 10 percent of the basic monomer in polymerized form in the final blend.

The present invention is applicable to blends of wool fibers with acrylic fibers in which the acrylic fibers are polymer blends wherein the principal acrylonitrile polymer, present to the extent of 70 to 98 percent by weight, is one of 80 or more percent of acrylonitrile and minor proportions of monomers copolymerizable therewith. The other component of the acrylic fiber blend is a polymer of 30 or more percent of a vinylpyridine or alkyl substituted vinylpyridine and up to 70 percent of another copolymerizable monomer. The two components of the blend polymers are proportioned so as to provide a total of at least 80 percent acrylonitrile and from 2 to 10 percent of a vinylpyridine, both in polymeric form in the blended acrylic fiber composition.

Useful pyridines for the preparation of the blending composition are vinylpyridines or alkyl substituted vinylpyridines, for example 2-vinylpyridine, 3-vinylpyridine, 4-vinylpyridine, 2-methyl-5-vinylpyridine, 2-vinyl-5-methylpyridine, 2-vinyl-5-ethylpyridine, 2-vinyl-4-methylpyridine, 3-vinyl-5-ethylpyridine, 2,4-dimethyl-6-vinylpyridine, and other vinylpyridines containing alkyl substituents wherein the alkyl radical has up to 4 carbon atoms.

Dyeable blended acrylic copolymers may have in addition to the functional components, acrylonitrile and a vinylpyridine, one or more components derived from nonfuctional monomers present as a comonomer with the acrylonitrile in the principal polymer or as a comonomer with a vinylpyridine in the blending polymer. Among the useful monomers for copolymerization with acrylonitrile to form the fiber-forming polymers may be mentioned vinyl acetate and other vinyl esters of mono-carboxylic acids having up to four carbon atoms, methyl methacrylate, and other alkyl methacrylates having up to four carbon atoms in the alkyl radical, methyl acrylate and other alkyl acrylates having up to four carbon atoms in the alkyl group, dimethylfumarate and other dialkyl fumarates having up to four carbon atoms in the alkyl groups, dimethyl maleate and other dialkyl maleates having up to four carbon atoms in the alkyl groups, styrene, alpha-methyl styrene, and other vinyl or isopropenyl substituted aromatic hydrocarbons, vinyl chloroacetate and other vinyl esters of halo-substituted acetic acids, vinylidene chloride, vinyl chloride and methacrylonitrile. Useful monomers for polymerization with the basic vinylpyridine monomers are styrene, alphamethyl styrene, vinyl chloride, vinylidene chloride, vinyl acetate, acrylonitrile, methacrylonitrile, acrylic acid, methacrylic acid, the alkyl acrylates, the alkyl methacrylates, vinyl ethers, the alkyl crotonates, the alkyl maleates, and the alkyl fumarates. Since the copolymers of the basic monomers with acrylonitrile have good thermal stability and solvent resistance, these copolymers are usually preferred for the incorporation of the basic monomer in the polymer blend.

Although as previously mentioned, incorporation of the dye receptive monomers has enabled the production of fibers having greatly improved dye receptivity, it has still not resulted in the production of acrylic fibers which may be union dyed in blends with wool fibers by means of the usual classes of wool dyes employing ordinary dyeing techniques. Wool has a greater affinity for most types of wool dyestuffs than even the modified acrylic fibers contemplated by this invention, so that union dyeing, especially in the medium and heavy shades, has not been practicable. The problem has been approached in the past chiefly by attempts to alter the relative affinity of the acrylic fibers so that good union could be acheived with the wool fibers when dyeing these fiber blends with dyestuffs normally employed to dye wool.

Various methods have been proposed in the past for altering the affinity of the acrylic fibers for the wool dyes. Initially the modified acrylic fibers contemplated by this invention were union dyed in blends with wool fibers through the use of metallized acid dyestuffs and relatively high concentrations of sulfuric acid. These modified acrylic fibers generally require pH values of less than 3.0 to permit effective dyeing. It was found that when using the metallized acid dyestuffs and from 8 to 12 percent sulfuric acid based on the weight of the goods successful dyeings could be secured in from 3 to 6 hours at the boil. However, this initial method possessed many drawbacks in the very long times required and the fact that the abnormally high concentrations of sulfuric acid likewise increased the rate of dye uptake of the wool fibers to the point where uniform results were practically impossible. Also, the method was limited to the use of metallized acid dyestuffs and was not suitable for use with many other of the useful classes of wool dyes.

Another method which has been disclosed is that of transfer of the dyestuff from the relatively heavily dyed wool fibers to the lightly dyed acrylic fibers by means of prolonged boiling in the presence of certain selected cationic agents in the presence of sulfuric acid. Although this method resulted in a somewhat broadened range of dyestuffs available it still was not suitable for use with the neutral premetallized dyes which are highly desirable for use in obtaining good lightfastness in light shades, since those dyestuffs effectively resisted transfer through the dyebath after having once been dyed on the wool fibers. Also, although the dyeing times were somewhat shortened they were still substantially longer than those required for the dyeing of wool fibers alone.

A further method of union dyeing such modified acrylic fibers in blends with wool fibers has been proposed which relies on increasing the dye affinity of the modified acrylic fibers by pretreatment of those modified acrylic fibers in relatively dilute acid solutions for comparatively short periods of time. This method, also, possessed serious disadvantages in that in blended fabrics the wool component was likewise necessarily treated with the acid which also increases its dyeing rate. In addition, the method required very close control of both the concentration of acid pretreating bath and the time the goods were allowed to remain in the bath to prevent overtreatment and consequent unlevel dyeing. The total dyeing times including the period of pretreatment still were substantially in excess of the dyeing times required for dyeing wool fibers alone with the same dyestuffs. Thus, the ranges of shades and suitable dyestuffs useful in dyeing unions of modified acrylic fibers with wool fibers in the past was severely limited, and the dyeing processes employed have required close control and long dyeing times.

It is, accordingly, the primary object of this invention to provide a method whereby blends of wool fibers with acrylic fibers composed of blended polymers containing at least 80 percent by weight of acrylonitrile in polymeric form and from two to ten percent of a vinylpyridine in polymeric form can be union dyed with any of the commonly used wool dyestuffs. Another object of this invention is to provide a method for such union dyeing by conventional one-bath wool dyeing processes requiring substantially the same dyeing times as the conventional wool dyeing processes. Still another object of this invention is to provide a method for such union dyeing which results in substantially union shades from very early in the period of contact with dyebath. Other objects of the invention will become apparent from the description hereinafter.

It has now been found that the objects of this invention can be accomplished by a method of union dyeing blends of acrylic fiber composed of blended polymers containing at least 80 percent by weight of acrylonitrile in polymeric form and two to ten percent of a vinylpyridine in polymeric form with wool fibers, which comprises subjecting the blend to the action of a dyebath containing a wool dye, from 0.5 percent to 6.0 percent of sulfuric acid base on the weight of the blended fibers, from 0.25 percent to 2.5 percent of a condensation product of ethylene oxide with a compound selected from higher fatty alcohols and higher fatty acids, and from 0.1 percent to 2.0 percent of the reaction product of ethylene chlorohydrin with the condensation product of equimolar quantities of hydroxyethyl ethylene diamine and stearic acid.

The reaction product of ethylene chlorohydrin with the condensation product of equimolar quantities of hydroxyethyl ethylene diamine and stearic acid is employed in the process of this invention chiefly for its cationic properties. However, the reaction product is a complex mixture of compounds whose exact composition has not as yet been determined. Some of the ingredients of the complex mixture which are known to be present are not believed to contribute substantially to the superior union dyeing results achieved while others definitely contribute thereto. Thus, the reaction product of ethylene chlorohydrin with the condensation product of equimolar quantities of hydroxyethyl ethylene diamine and stearic acid contains most and can contain all of the following compounds: unreacted stearic acid, unreacted hydroxyethyl ethylene diamine, the stearic acid salt of hydroxyethyl ethylene diamine, the hydrochloride of hydroxyethyl ethylene diamine, 1-(2-hydroxyethyl)-2-heptadecyl-imidazoline and the hydrochloride thereof, 1,1,(2-hydroxyethyl)-2-heptadecyl-imidazoline and the hydrochloride thereof, the stearic acid ester of 1-(2-hydroxyethyl)-2-heptadecyl-imidazoline and the hydrochloride thereof, the monostearyl derivative of symmetrical bis-(2-hydroxyethyl)ethylene diamine and the hydrochloride thereof, the monostearyl derivative of unsymmetrical bis(2-hydroxyethyl) ethylene diamine and the hydrochloride thereof, the stearic acid ester of monostearyl hydroxyethyl ethylene diamine, stearyl hydroxyethyl ethylene diamine and the hydrochloride thereof, and the distearamide of hydroxyethyl ethylene diamine. The desired union dyeing results which are the subject of this invention are realized by the use of the complex reaction product employed, and when, throughout the course of this specification and the appended claims, the language, "reaction product of ethylene chlorohydrin with the condensation product of equimolar quantities of hydroxyethyl ethylene diamine and stearic acid," is used this complex reaction mixture is intended.

The amount of the reaction product of ethylene chlorohydrin with the condensation product of equimolar quantities of hydroxyethyl ethylene diamine and stearic acid which can be used in the process of the present invention can vary between 0.1 and 2.0 percent based on the weight of the fiber dyed. When employing amounts of the wool dyes normally used to dye light shades on 100 percent wool amounts of from 0.2 to about 0.5 percent on the weight of the fibers have generally been found to be satisfactory. If increased amounts of dyestuffs are employed in order to secure deeper shades, then the higher percentages of the complex reaction product within the stated range can be employed. Since when greater percentages of the complex reaction product than those stated are used the exhaustion of the wool dyes upon the fibers is severely retarded, it is preferred to use the reaction product in amounts of from 0.1 to 1.0 percent on the weight of the fibers dyed.

With certain of the common wool dyes, particularly the mordant acid, metallized acid and neutral premetallized dyes, the use of the reaction product of ethylene chlorohydrin with condensation product of equimolar quantities of hydroxyethyl ethylene diamine and stearic acid sometimes results in the formation of deposits of scum and insoluble material which causes streaky and uneven dyeing of the fibers or fabrics dyed. Therefore, when using this complex reaction product it has been found necessary to include in the dyebath a condensation product of ethylene oxide with a compound selected from the group consisting of higher fatty alcohols or higher fatty acids for its dispersing qualities. Those ethylene oxide condensates can be employed which are the result of the condensation of five to fifty moles of ethylene oxide per mole of a higher fatty acid or a higher fatty alcohol in which the acid or alcohol contains from 12 to 20 carbons atoms. An amount of one of the ethylene oxide condensates described above of from about 0.25 percent to 2.5 percent based on the weight of the fibers being dyed can be successfully employed in the dyebath. It has been found advantageous when employing the lower amount of the stated range of the reaction product of ethylene chlorohydrin with the condensation product of equimolar quantities of hydroxyethyl ethylene diamine and stearic acid to use a higher percentage within the stated range of amounts of the ethylene oxide condensate. In general, amounts of from about 0.5 percent to about 1.5 percent of the ethylene oxide condensates based on the weight of the fibers dyed have been found to be preferable.

The amount of sulfuric acid required to achieve union dyeing between the modified acrylic fibers and the wool fibers according to the process of this invention varies with the amount and type of dyestuff employed. Generally, a greater concentration of acid is required when using greater amounts of dyestuff to secure deeper shades. Neutral premetallized dyes have been found generally to require the least amount of sulfuric acid, usually from about 0.5 to 3.0 percent on the weight of the goods dyed. The acid dyes generally require from about 2.5 to 5.0 percent based on the weight of the fibers dyed. The mordant acid dyes have been found to require from about 3.0 percent to 5.0 percent and the acid metallized dyes from about 3.5 to about 6.0 percent sulfuric acid on the weight of the fibers dyed. It has been found that the process of this invention is suitable for use with all of the common classes of wool dyestuffs, including acid dyes, mordant acid dyes, metallized acid dyes, and neutral premetallized dyes. Examples of certain acid dyes which have been successfully employed to dye blends of modified acrylic fibers with wool fibers levelly and uniformly by the process of this invention include: Alizarin Gerinol B (C.I. Acid Violet 39, C.I. 68500), Wool Fast Scarlet G Supra (C.I. Acid Red 73, C.I. 27290), Sandocryl Blue GLCI, Polar Brilliant Blue GAW (C.I. Acid Blue 127, C.I. 61135), Alizarin Rubinol 3G-CF (C.I. Acid Red 82, C.I. 68205), Alizarin Light Blue 5GL (C.I. Acid Blue 52), Sandocryl Red 5BLCI, Fast Light Yellow GGXN (C.I. Acid Yellow 17, C.I. 18965), and Fast Scarlet BA (C.I. Acid Red 66, C.I. 26905). Examples of mordant acid dyestuffs which can be used include Omega Chrome Yellow RS (C.I. Mordant Yellow 20, C.I. 14110), Eriochrome Flavine A (Mordant Yellow 5, C.I. 14130), Omega Chrome Orange G (C.I. Mordant Orange 6, C.I. 26250), Chrome Fast Orange 3RLA (C.I. Mordant Orange 4, C.I. 18940), Eirochrome Phosphine RR (C.I. Mordant Orange 18), Eriochrome Red PE (C.I. Mordant Red 9, C.I. 16105), Eriochrome Red 3B (C.I. Mordant Red 37), Acid Chrome Red BA (C.I. Mordant Red 21, C.I. 17995), Eriochrome Violet 5B (C.I. Mordant Blue 9, C.I. 14855), Acid Chrome Blue 3BA, Chrome Fast Brown 3GL (C.I. Mordant Brown 50), Eriochrome Dark Brown PWS (C.I. Mordant Brown 40, C.I. 17590), Alizarol Brown B (C.I. Mordant Brown 61, C.I. 16070), and Eriochrome Olive BL (C.I. Mordant Green 26, C.I. 18180). Examples of metallized acid dyes which can be used include Gycolan Yellow BEL (C.I. Acid Yellow 54, C.I. 19010), Vitrolan Orange R (C.I. Acid Orange 76, C.I. 18870), Gycolan Orange GRL (C.I. Acid Orange 62), Chromolan Red 3RB (C.I. Acid Red 207), Neolan Bordeaux BE (C.I. Acid Red 212), Gycolan Blue 2RL (C.I. Acid Blue 154), Neolan Blue 2G (C.I. Acid Blue 158 A, C.I. 15050), Neolan Black WA Ex. Conc. (C.I. Acid Black 52, C.I. 15711), Neolan Pink BA Conc. (C.I. Acid Red 186, C.I. 18810), Colorfast Orange YF (C.I. Acid Orange 69), and Neolan Flavine GFE (C.I. Acid Yellow 103). Examples of neutral premetallized dyestuffs which can be used in the process of the present invention include Cibalan Blue BL (C.I. Acid Blue 168), Lanasyn Brown RL (C.I. Acid Brown 28), Supralan Olive Green BA, Cibalan Yellow GRL (C.I. Acid Yellow 116), Cibalan Bordeaux BL, Cibalan Red 2GL (C.I. Acid Red 211), and Cibalan Orange RL (C.I. Acid Orange 88). Though every individual dye from each of the enumerated classes does not function to dye union shades in every case, a large number of dyestuffs in each named class can be effectively utilized to dye the modified acrylic fibers and wool fibers evenly and levelly in the process of this invention, and it is a simple matter to determine the amounts and identity of individual dyestuffs within the enumerated classes in the same manner as is done with union dyeings of all wool yarns and fabrics.

The method of carrying out the instant process which has been found to be preferable involves entering the goods in a bath of water alone at a temperature of from about 40° to 55° C. and allowing them to circulate in a blank bath for time sufficient to come to the temperature of the bath, usually about ten minutes. Thereafter the additions of all the required dyebath ingredients are made at that temperature. These include the reaction product of ethylene chlorohydrin with the condensation product of equimolar quantities of hydroxyethyl ethylene diamine and stearic acid, a condensation product of ethylene oxide with a compound selected from the group consisting of higher fatty alcohols and higher fatty acids, a wool dyestuff and the requisite amount of sulfuric acid for the particular type dyestuff employed. It is preferred to add the ethylene oxide condensate prior to the addition of dyestuff to avoid any possibility of the formation of precipitates or insoluble matter. Thereafter the temperature is raised to a temperature of from about 95° to 100° C. over a period of from about 20 to 60 minutes and held at that temperature for from 30 to 90 minutes. Generally the goods are sampled after about 45 minutes at the boil to determine if a good union shade has been developed. In those cases where union dyeing was incomplete in that the wool was the fuller shade, a further dyeing period of from 30 to 45 minutes at the boil generally produces excellent union dyeings. Thus, good union dyeings are generally secured in periods of from approximately one to two and one half total hours in the dyebath.

This new process possesses many advantages over the processes previously proposed for union dyeing blends of wool fibers and acrylic fibers composed of blended polymers containing at least 80 percent by weight of acrylonitrile in polymeric form and from 2 to 10 percent of a vinylpyridine in polymeric form. The chief advantage lies in the ability to union dye to even, level, deep and fast shades blends of the modified acrylic fibers with wool fibers using any of the commonly employed classes of wool dyes. Furthermore, these advantageous results are realized by the use of normal one-bath wool dyeing procedures and with dyeing times closely similar to those for dyeing 100 percent wool. The lightfastness properties of dyeings made on modified acrylic fiber and wool fiber blends by the method of this invention have been markedly improved over previously proposed methods, and are sufficient to give satisfactory lightfastness in shades required for men's clothing applications. There is no necessity for modification of wool dyeing equipment since generally the same temperatures and volumes of dyebath are successfully employed in the process of this invention The application of the present invention is more particularly set out and described in the examples below, wherein references to the Colour Index refer to the Second Edition thereof, published by the Society of Dyers and Colourists and the American Association of Textile Chemists and Colorists (1956). All percentages are based on the weight of the fabric dyed.

EXAMPLE I

Separate dyeings were preformed on knitted fabrics composed of 100 percent wool and 100 percent of an acrylic fiber composed of blended polymers containing 89 percent acrylonitrile and 6 percent 2-methyl-5-vinylpyridine in the polymer blend. Dyebaths having a liquor to fabric ratio of 50:1 were prepared containing the following ingredients:

|  | Percent |
|---|---|
| Fast Scarlet BA (C.I. Acid Red 66, C.I. 26905) | 0.5 |
| Condensate of one mole of oleyl alcohol with 20 moles of ethylene oxide | 1.5 |
| Sulfuric acid | 4.0 |

The fabrics were entered into the dyebaths at 25° C. and agitated at that temperature for 15 minutes. Thereupon the temperature was raised to 100° C. over a period of 30 minutes at the rate of 2.5° C. per minute and thereafter held at 100° C. for an additional period of 30 minutes. The agitated dyebaths were sampled at frequent intervals and the percent of exhaustion of the dyebath onto the respective fabrics were determined spectrophotometrically. The results are set out in Table IA below.

*Table IA*

| Time (Mins.) | Temp., °C. | Percent Exhaustion on— | |
|---|---|---|---|
| | | Acrylic Fiber | Wool |
| −12 | 25 | 14 | 10 |
| −9 | 25 | 26 | 16 |
| −5 | 25 | 30 | 18 |
| 0 | 25 | 36 | 20 |
| 5 | 40 | 40 | 30 |
| 9 | 46 | 45 | 46 |
| 12 | 55 | 53 | 75 |
| 15 | 62 | 63 | 95 |
| 18 | 70 | 77 | 98 |
| 25 | 90 | 92 | 99 |
| 30 | 100 | 95 | 99 |
| 45 | 100 | 97 | 99 |
| 60 | 100 | 97 | 99 |

Identical dyeings on the same knit fabric samples and under identical conditions were conducted in the same manner except that each of the dyebaths contained in addition to the abovenamed ingredients 3.0 percent of an aqueous paste of the reaction product of ethylene chlorohydrin reacted with the condensation product of equimolar quantities of hydroxyethyl ethylene diamine and stearic acid which paste contained approximately 65 percent water. The percent exhaustion on each of the fabrics was again determined in the same manner as above, and the results are set out in Table IB below.

*Table IB*

| Time (Mins.) | Temp., °C. | Percent Exhaustion on— | |
|---|---|---|---|
| | | Acrylic Fiber | Wool |
| −12 | 25 | 5 | 5 |
| −9 | 25 | 7 | 7 |
| −5 | 25 | 8 | 8 |
| 0 | 25 | 9 | 9 |
| 5 | 40 | 11 | 11 |
| 9 | 46 | 14 | 14 |
| 12 | 55 | 15 | 17 |
| 15 | 62 | 17 | 23 |
| 18 | 70 | 23 | 33 |
| 22 | 80 | 33 | 48 |
| 27 | 94 | 55 | 66 |
| 30 | 100 | 62 | 71 |
| 35 | 100 | 71 | 77 |
| 45 | 100 | 75 | 79 |
| 60 | 100 | 77 | 81 |

It will be noted from Table IA that in the absence of the complex reaction product of cationic nature the modified acrylic fiber first dyed at a higher rate than the wool at 25° C. but as the temperature was raised the dyeing rate of wool became much greater than that of the modified acrylic fibers. After only 15 minutes of heating the wool fiber had essentially exhausted the dyebath whereas the modified acrylic fabric did not reach essential exhaustion until the temperature of the dyebath had reached 100° C. after 30 minutes. It is apparent from the data in Table IB that the dyeing rates of both fibers have been significantly reduced, but that the effect has been much greater on the wool. Thus the dyeing rates for both the fibers have been brought essentially together, especially in the earlier stages of the dyeings, in marked contradistinction to the previous dyeings. Even after 15 minutes at the boil only approximately 80 percent exhaustion had occurred whereas essentially complete exhaustion had taken place upon reaching the boil in the absence of the complex reaction product.

EXAMPLE II

A series of three dyeings of a fabric composed of equal parts of wool and an acrylic fiber composed of blended polymers containing 89 percent acrylonitrile and 6 percent 2-methyl-5-vinylpyridine in the polymer blend were made to determine the effect of the concentration of sulfuric acid in the presence of the complex reaction product. Three separate dyeings were made using dyebaths with a 50:1 liquor to fabric ratio and containing 0.6 percent Fast Scarlet BA (Acid Red 66, C.I. 26905), 1.5 percent of a condensate of one mole of oleyl alcohol and 20 moles of ethylene oxide, 0.75 percent of a 35 percent aqueous paste of the complex reaction product of ethylene chlorohydrin with the condensation product of equimolar quantities of hydroxyethyl ethylene diamine and stearic acid, and 2.0%, 4.0% and 8.0% of sulfuric acid respectively. The dyeings were carried out for 90 minutes at 100° C. after bringing the baths to the boil in 30 minutes. The percent dyestuff deposited on the modified acrylic component upon reaching 100° C. and at thirty minute intervals during the dyeing was determined. The results are set forth in Table II below:

*Table II*

| Time at 100° C. (Mins.) | Percent Dye on Acrylic Fiber | | |
|---|---|---|---|
| | 2% $H_2SO_4$ | 4% $H_2SO_4$ | 8% $H_2SO_4$ |
| 0 | 19 | 28 | 40 |
| 30 | 23 | 44 | 50 |
| 60 | 25 | 54 | |
| 90 | 27 | 60 | 68 |

From the above data it is apparent that union shades are obtained with 8 percent sulfuric acid in approximately 30 minutes at the boil whereas in the case of 4 percent sulfuric acid approximately 45 minutes at the boil is required to bring about a suitable union. At the 2 percent sulfuric acid level union is not obtained even after 90 minutes boiling time in the presence of the amount of complex reaction product employed.

EXAMPLE III

A series of dyeings was made using varying quantities of the complex resulting from the reaction of ethylene chlorohydrin with the condensation product of equimolar quantities of hydroxyethyl ethylene diamine and stearic acid. The dyeings were conducted on knitted fabric samples of 100 percent of the same acrylic fibers described in Example I and 100 percent wool in which the two fabric samples were dyed competitively, i.e., in each case there were five grams of the 100 percent wool fabric and 5 grams of the 100 percent modified acrylic fabric in each dyebath. The dyeings were conducted in the same manner as those in Example I above in that the dyeings of fabrics were begun at 25° C., the dyebaths were raised to a temperature of 100° C. over a 30-minute period, and they were maintained at the boil for periods of 90 minutes thereafter. The dyebaths had a liquor to fabric ratio of 50:1 and contained the following ingredients:

|  | Percent |
|---|---|
| Fast Scarlet BA (C.I. Acid Red 66, C.I. 26905) | 0.5 |
| Condensate of one mole of oleyl alcohol with 20 moles of ethylene oxide | 1.5 |
| Sulfuric acid | 4 |
| Reaction product of ethylene chlorohydrin with the condensate of equimolar quantities of hydroxyethylene diamine and stearic acid (aqueous paste of 35% solids) | 0.75 / 1.5 / 3.0 |

Samples of the two fabrics were taken when the dyebaths had reached 100° C. and after 30, 60, and 90 minutes at the boil. The color balance between the modified acrylic fibers and the wool fibers was determined by reflectance measurements for each of the samples taken. The reflectance measurements were converted to the Kubelka-Munk function $\theta$, defined as $$\theta = \frac{(1-R)^2}{2R}$$

where R is the percent reflectance. This function has been found to be proportional to the amount of dye on the respective fibers. The color balance between the wool fibers and the modified acrylic fibers is defined as $\theta_W/\theta_A$ where $\theta$ is the Kubelka-Munk function of the respective fibers. The results of these dyeings, expressed as color balance, are set out in Table III. A figure for the color balance of greater than 1.0 signifies heavier dyeing of the wool component, while a figure of less than 1.0 signifies heavier dyeing of the modified acrylic fibers.

*Table III*

| Time at 100° C. (Mins.) | Color Balance ($\theta_W/\theta_A$) at Percentages Reaction Product | | |
|---|---|---|---|
|  | 0.75% | 1.5% | 3.0% |
| 0 | 2.8 | 2.5 | 2.5 |
| 30 | 1.1 | 1.3 | 1.2 |
| 60 | 0.87 | 0.95 | 0.93 |
| 90 | 0.73 | 0.84 | 0.82 |

From the above data it is apparent that at any one of the concentrations of the complex reaction product tested and at 4% sulfuric acid based on the weight of the fabric it is possible to secure union shades after dyeing from 30 to 60 minutes at 100° C.

EXAMPLE IV

Dyeings were conducted in the same manner as Example III above employing equal weights of 100 percent wool knitted fabrics and 100 percent the same modified acrylic fiber as described in Example I. The dyeings were conducted in the same manner as those in Example III and samples were taken at the time of reaching 100° C. and at thirty-minute intervals thereafter. Reflectance measurements of the dyed fabrics were made and the color balance expressed as $\theta_W/\theta_A$, where $\theta_W/\theta_A$ is the ratio between the Kubelka-Munk functions for the wool and modified acrylic fibers respectively. The dyestuff employed was a different acid dyestuff from that employed in Example III. The dyebaths had a liquor to fabric ratio of 30:1 and contained the following ingredients:

|  | Percent |
|---|---|
| Croceine Scarlet MOO (C.I. Acid Red 73, C.I. 27290) | 2.0 |
| Condensate of one mole of oleyl alcohol with 20 moles of ethylene oxide | 1.5 |
| Reaction product of ethylene chlorohydrin with the condensation product of equimolar quantities of hydroxyethyl ethylene diamine and stearic acid (aqueous paste of 35% solids) | 0.75 |
| Sulfuric acid | 4.0 |

The results of the measurements of reflectance of each of the fabrics dyed for the various timers are set out in Table IV below.

*Table IV*

| Time at 100° C. (mins.): | Color balance ($\theta_W/\theta_A$) |
|---|---|
| 0 | 1.1 |
| 30 | 1.0 |
| 60 | 1.0 |
| 90 | 1.0 |

From the above data it is apparent that under the conditions of this dyeing the respective fabrics reached union shade in less than thirty minutes at the boil and continued to maintain that union throughout the dyeing cycle.

EXAMPLE V

A dyeing employing an acid metallized dyestuff was performed in the same manner as Example III above. The dyebath had a liquor to fabric ratio of 30:1 and contained the following ingredients:

|  | Percent |
|---|---|
| Gycolan Blue 2RL (C.I. Acid Blue 154) | 3.0 |
| Condensate of one mole of oleyl alcohol with 20 moles of ethylene oxide | 1.5 |
| Reaction product of ethylene chlorohydrin with the condensate of equimolar quantities of hydroxyethyl ethylene diamine and stearic acid (aqueous paste of 35% solids) | 0.75 |
| Sulfuric acid | 5.0 |

Reflectance measurements on the samples taken when the dyebath reached the boil and at thirty minute intervals thereafter were made in the same manner as set out in Example III above. The color balance between the wool and modified acrylic fibers expressed as the ratio between the Kubelka-Munk functions is set out in Table V below.

*Table V*

| Time at 100° C. (mins.): | Color balance ($\theta_W/\theta_A$) |
|---|---|
| 0 | 1.2 |
| 30 | 1.0 |
| 60 | 1.0 |
| 90 | 1.0 |

EXAMPLE VI

A dyeing was made in the manner of the Example III above employing a mordant acid dye. The dyeing was conducted in the same manner as set out in Example III except for substitution of the dyestuff. The dyebath had a liquor:fabric ratio of 30:1 and contained the following ingredients:

|  | Percent |
|---|---|
| Acid Chrome Blue 3 BA Conc. | 3.0 |
| Condensate of one mole of oleyl alcohol with 20 moles of ethylene oxide | 1.5 |
| Reaction product of ethylene chlorohydrin with the condensation product of equimolar quantities of hydroxyethyl ethylene diamine and stearic acid (aqueous paste of 35% solids) | 0.75 |
| Sulfuric acid | 5.0 |

Samples were taken and reflectance measurements made in the same manner as set out in Example III above. The results of the dyeing, expressed as color balance, the ratio between the Kubelko-Munk functions of the respective fabrics, are set out in Table VI below.

*Table VI*

| Time at 100° C. (min.): | Color balance ($\theta_W/\theta_A$) |
|---|---|
| 0 | 1.3 |
| 30 | 1.0 |
| 60 | 1.0 |
| 90 | 1.0 |

EXAMPLE VII

A dyeing was made employing a different mordant acid dye than that employed in Example VI above, but conducted in the same manner as in Example VI. The dyebath possessed a liquor to fabric ratio to 30:1 and contained the following ingredients:

| | Percent |
|---|---|
| Omega Chrome Orange G (C.I. Mordant Orange 6, C.I. 26250) | 3.0 |
| Condensate of one mole of oleyl alcohol with 20 moles of ethylene oxide | 1.5 |
| Reaction product of ethylene chlorohydrin with the condensation product of equimolar quantities of hydroxyethyl ethylene diamine and stearic acid (aqueous paste of 35% solids) | 0.75 |
| Sulfuric acid | 5.0 |

The results of the dyeing expressed as color balance between the respective fabrics are set out in Table VII below.

Table VII

| Time at 100° C. (min.): | Color balance ($\theta_W/\theta_A$) |
|---|---|
| 0 | 1.2 |
| 30 | 1.0 |
| 60 | 1.0 |
| 90 | 1.0 |

EXAMPLE VIII

A dyeing was made in the same manner as Example III except a neutral dyeing premetallized dyestuff was employed. The dyeing was carried out in the same manner as above with the dyebath possessing a liquor to fabric ratio of 30:1 containing the following ingredients:

| | Percent |
|---|---|
| Cibalan Blue BL (C.I. Acid Blue 168) | 1.0 |
| Condensate of one mole of oleyl alcohol with 20 moles of ethylene oxide | 1.5 |
| Reaction product of ethylene chlorohydrin with the condensate of equimolar quantities of hydroxyethyl ethylene diamine and stearic acid (aqueous paste of 35% solids) | 0.75 |
| Sulfuric acid | 2.5 |

Samples were taken in the same manner as set forth above and the results of reflectance measurements expressed as color balance between the respective fabrics are set out in Table VIII below.

Table VIII

| Time at 100° C. (min.): | Color balance ($\theta_W/\theta_A$) |
|---|---|
| 0 | 1.3 |
| 30 | 1.2 |
| 60 | 1.1 |
| 90 | 1.1 |

The respective fabrics reached substantial color balance after approximately 60 minutes at the boil.

It may be seen from the foregoing examples that dyes selected from all of the common classes of wool dyestuffs can be employed to secure union dyeings between wool fibers and acrylic fibers composed of blended polymers containing at least 80 percent by weight of acrylonitrile in polymeric form and from two to ten percent of a vinylpyridine in polymeric form when employing the process of this invention. Furthermore, it may be seen that the union dyeings may be achieved through the use of conventional one-bath processes. Most important, it may be seen that the dyeing times required in the process of this invention are substantially no longer, and in many cases much shorter, than the dyeing times required for dyeing all wool fabrics with the same dyestuffs. The blends of the acrylic fibers with wool fibers may be in the form of yarns in the skein or fabrics. These results have been achieved even though the union dyeing of these dissimilar fibers has proved to be a very difficult problem, as is evidenced by the various proposed methods suggested in the prior art for achieving this desirable result.

As many variations within the spirit and scope of this invention will occur to those skilled in the art, it is to be understood that the invention is not limited to the specific embodiments thereof except as set forth in the appended claims.

I claim:

1. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing a wool dye, from 0.5 percent to 6.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers.

2. The method according to claim 1 in which the wool dye is an acid dye.

3. The method according to claim 1 in which the wool dye is an acid metallized dye.

4. The method according to claim 1 in which the wool dye is a mordant acid dye.

5. The method according to claim 1 in which the wool dye is a neutral premetallized dye.

6. The method according to claim 1 in which the condensation product of ethylene oxide and a higher fatty alcohol is the condensation product of ethylene oxide and oleyl alcohol.

7. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing a wool dye, from 0.5 percent to 6.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers at a temperature of from 95° to 100° C. for from 30 to 90 minutes.

8. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing an acid dye, from 2.5 percent to 5.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers at a temperature of from 95° to 100° C. for from 30 to 90 minutes.

9. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing an acid metallized dye, from 3.5 percent to 6.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers at a temperature of from 95° to 100° C. for from 30 to 90 minutes.

10. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing a mordant acid dye, from 3.0 percent to 5.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers at a temperature of from 95° to 100° C. for from 30 to 90 minutes.

11. A method of union dyeing blends of acrylic fibers composed of blended polymers containing at least 80 percent by weight of acrylonitrile in polymeric form and from 2 to 10 percent by weight of a vinylpyridine in polymeric form with wool fibers which comprises subjecting the blend to the action of a dyebath containing a neutral premetallized dye, from 0.5 percent to 3.0 percent of sulfuric acid, from 0.25 percent to 2.5 percent of a condensation product of ethylene oxide and a compound selected from the group consisting of higher fatty acids and higher fatty alcohols, and from 0.1 percent to 2.0 percent of the reaction product of ethylene chlorohydrin with the condensation product of equimolar quantities of hydroxyethyl ethylene diamine and stearic acid, based on the weight of the blended fibers at a temperature of from 95° to 100° C. for from 30 to 90 minutes.

References Cited in the file of this patent

UNITED STATES PATENTS

| | | |
|---|---|---|
| 2,083,182 | Zweibel | June 8, 1937 |
| 2,228,369 | Schoeller | Jan. 14, 1941 |
| 2,254,965 | Kling | Sept. 2, 1941 |
| 2,637,717 | Basdekis | May 5, 1953 |
| 2,772,943 | Hiller | Dec. 4, 1956 |

OTHER REFERENCES

Sebba et al.: J. Chem. Soc., January-June 1940, pp. 106–114.

Mansfield: "Influence of Monolayers on the Natural Rate of Evaporation of Water," Nature, February 5, 1955, pp. 247–249.

Laycock: "Cetyl Alcohol Controls Evaporation," Water and Sewage Works, August 1956.

Gregory: "Uses and Applications of Chemicals and Related Materials," vol. II, Rheinhold Publishing Corp., New York, New York, pp. 236–237.